United States Patent [19]
Hino et al.

[11] 3,720,983
[45] March 20, 1973

[54] APPARATUS FOR THE MANUFACTURE OF CRIMPED BULKY FILAMENTS

[76] Inventors: Hazime Hino, 5-5 Tominosato-machi, Takatsuki-shi; Tsutomu Nakamura, 1, Oaza Minohara; Nobuo Takahashi, 5-18, 4-chome, Shimohozumi, both of Ibaraki-shi, all of Japan

[22] Filed: Oct. 29, 1971

[21] Appl. No.: 193,790

Related U.S. Application Data

[63] Continuation-in-part of Ser. No. 847,548, Aug. 5, 1969, abandoned.

[30] Foreign Application Priority Data

Aug. 6, 1968 Japan............................43/56053

[52] U.S. Cl....................................................28/1.4
[51] Int. Cl. ...............................................D02g 1/16
[58] Field of Search............................28/1.4, 72.12

[56] References Cited

UNITED STATES PATENTS

| | | | |
|---|---|---|---|
| 3,143,784 | 8/1964 | Scott | 28/1.4 |
| 3,145,446 | 8/1964 | Sussman | 28/72.12 |
| 3,255,508 | 6/1966 | Weiss et al. | 28/1.4 |
| 3,341,912 | 9/1967 | Dyer et al. | 28/1.4 |

*Primary Examiner*—Louis K. Rimrodt
*Attorney*—Leonard W. Sherman et al.

[57] ABSTRACT

In an apparatus for preparing crimped bulky filaments from continuous non-crimped filaments having a total denier of 40 – 5,000 using a moving screen and a jet stream of a temperature higher than 200° C. and a pressure of 3–12 kg/cm² gauge, which impinges on the screen accompanying the filaments, at a filament feeding rate of at least 250 m/min and $(x) = D \times R$ is at least 60,000 de.meter/min, the improvement in that the screen is an assembly screen having a perforation ratio of 20 – 60 percent, the distance between the upper and lower screens being up to 2 mm, the perforation area of the lower screen being smaller than the area of the upper screen, and the distance between the open end of the jet and the upper screen being up to 3 mm.

4 Claims, 15 Drawing Figures

Fig. 1-A
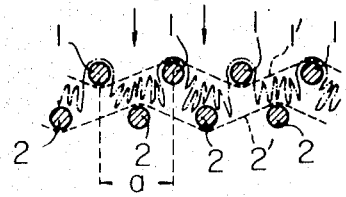
Fig. 1-B
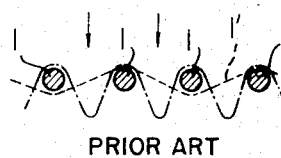
PRIOR ART
Fig. 2-A
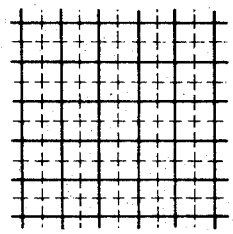
Fig. 2-B
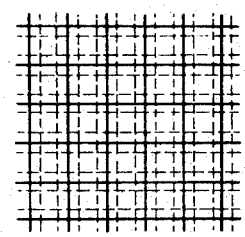
Fig. 2-C
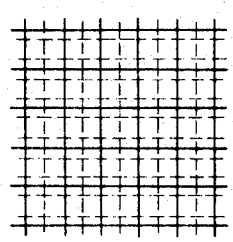
Fig. 2-D
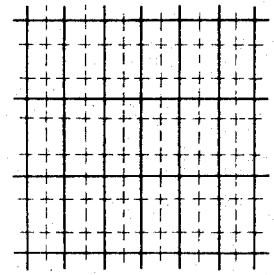
Fig. 2-E
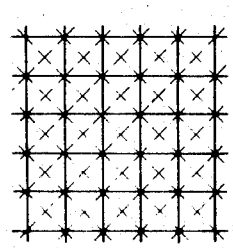
Fig. 2-F
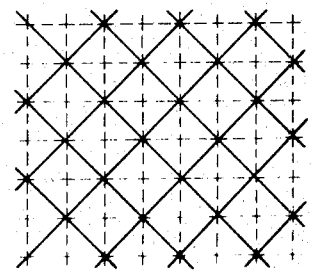

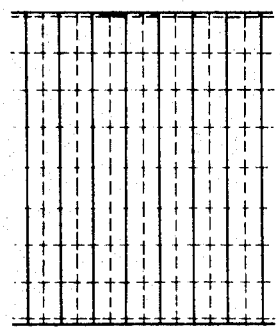
Fig. 3-A
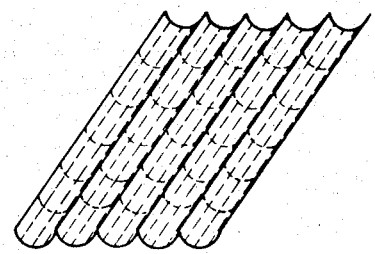
Fig. 3-B
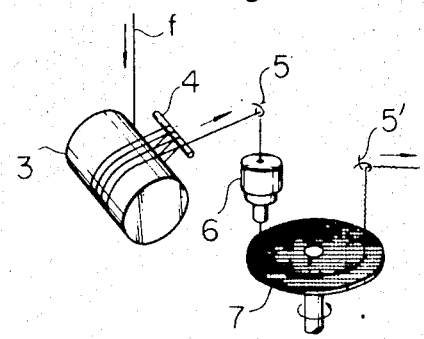
Fig. 4-A
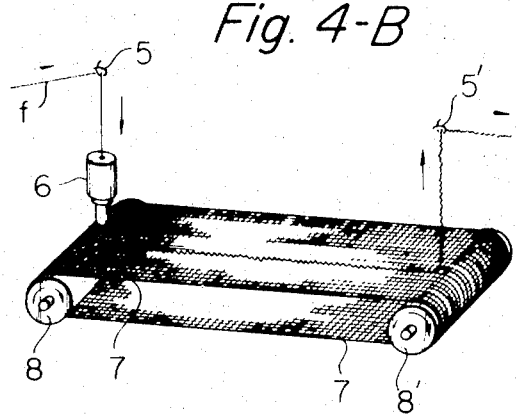
Fig. 4-B

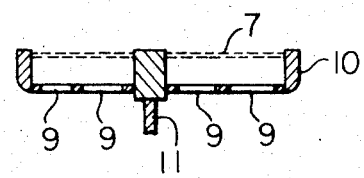
Fig. 5-A
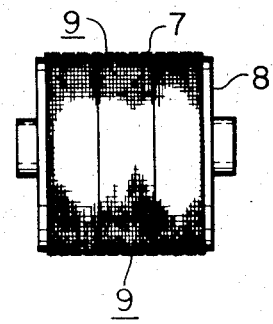
Fig. 5-B
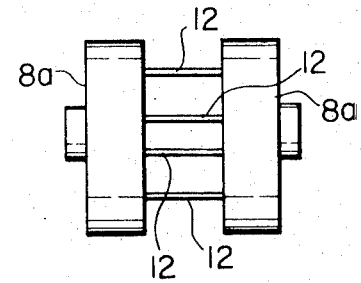
Fig. 5-B'

APPARATUS FOR THE MANUFACTURE OF CRIMPED BULKY FILAMENTS

This application is a continuation-in-part application of the application Ser. No. 847,548 filed on Aug. 5, 1969, which has now been abandoned.

This invention relates to an apparatus for preparing advantageously fine and uniform crimped bulky filaments having a highly improved percentage crimp with stable operability as compared with crimped bulky filament prepared using a conventional apparatus.

More specifically, this invention relates to the improvement of an apparatus for preparing crimped bulky filaments including a feed roll for feeding thermoplastic synthetic continuous non-crimped filaments having a total denier of 40 – 5,000 at a rate of at least 250 m/min. to a jet having an open end for projecting a heated jet stream accompanying the filaments fed to the jet, said jet stream being held at a temperature from 200° C. to a point 40° C. higher than the melting point of the filament and the pressure of said jet stream being maintained at 3 to 12 kg/cm² gauge, a moving screen upon which the heated jet stream impinges and which allows the heated jet stream to pass therethrough while leaving the filaments on the screen, and a take-up roll for removing the crimped filaments, wherein the value $(x)$ expressed by the following formula is at least 60,000 de.meter/min.

$$(x) = D \times R$$

in which $D$ is the total denier of the filaments fed to the jet and $R$ is the filament feeding rate, said improvement comprising said moving screen being an assembly screen having a perforation ratio of from 20 to 60 percent and including at least a perforated upper screen and a perforated lower screen, said upper and lower screens being spaced by a distance up to 2 mm. the plane perforation area of each portion of said lower screen overlapping each perforation of said upper screen being smaller than the plane area of each perforation of said upper screen, said portion of said lower screen having an open space sufficient for the jet stream to pass through said portion and freely escape from the assembly screen, and said open end of said jet being speced from said upper screen by a distance of up to 3 mm.

There has been known a process for the preparation of crimped bulky filaments which comprises projecting thermoplastic synthetic continuous non-crimped filaments such as continuous filaments of polyamides and of polyesters from a nozzle together with a heated stream of compressible fluid, impinging the projected thermoplastic synthetic continuous filaments in a heated jet stream upon a moving foraminous surface such as a rotating screen disk or a screen endless belt, passing the stream through the foraminous surface while leaving on the surface the continuous filaments plasticized by the heated fluid, which is generally heated air or other heated gas, forming crimps in the filaments by the impingement of the filaments in a plasticized condition upon the foraminous surface, and taking up from the foraminous surface the crimped filaments which have been cooled according to the movement of the surface (see U.S. Pat. No. 3,156,028 and Canadian Patent No. 651,831).

It is easily understood that in the preparation of crimped bulky filaments of this type the configuration of the foraminous surface or screen upon which thermoplastic synthetic continuous filaments are impinged in a plasticized condition exerts a great influence on the condition of crimps imparted to the filaments.

As a result of our research made with a view to developing an apparatus capable of providing advantageously crimped bulky filaments of the above mentioned type having a high percentage crimp beyond that obtained with a conventional apparatus, we have found that it is important to depart from the technical concept of the prior art that it is sufficient to merely impinge filaments in a plasticized condition upon a screen and separate them from the jet stream by means of the screen, but to take note of an action of the jet stream on filaments in the depth of each perforation of the screen in the jet stream-passing direction (hereinafter abbreviated as "screen depth"). It has also been found that by employing an assembly screen comprising at least two adjacent layers of screens it is possible to impart to filaments an action of, so to speak, numerous small stuffer crimpers, the number of which corresponds to the number of perforations of the screen, in said screen depth. Accordingly, even if the uppermost screen of the assembly screen is a screen which has such a perforation area as would impart only coarse crimps if used in the conventional process, since a lower screen is provided adjacent to the uppermost screen, it is possible to increase the resistance imposed on the jet stream when it passes through the portions of the lower screen overlapping each perforation of the uppermost screen. Consequently, an action like that of a stuffer crimper is caused in the screen depth between two layers of said screens, and hence, crimps of high percentage crimp can be imparted to filaments without substantial increase of the disadvantageous reflection of the jet stream from the uppermost screen. In short, it has now been found that this invention can provide crimped bulky filaments having high percentage crimp, say, about 40 percent, which value has never been obtained by the conventional process.

It has also been found that a combination of the perforation ratio, the distance between the upper and lower screens, and the distance between the open end of the jet and the upper screen is considerably critical for simultaneously achieving various advantages such as the highly improved percentage crimp, fine crimps, and longitudinally uniform crimps of the resulting crimped bulky filaments by crimping thermoplastic synthetic continuous non-crimped filaments having a total denier (D) of 40 to 5,000, preferably 40 to 4,300 using a jet stream held at a temperature of from 200° C. to a point 40° C. higher than the melting point of the filaments and at a pressure of 3 to 12 kg/cm² gauge, preferably 4 to 10 kg/cm² gauge so that the filament feed rate (R) of at least 250 meters/min. and the $(x)=(D) \times (R)$ of at least 60,000 de.meter/min. are satisfied, and processing the filaments using said assembly screen at the fastest possible speed according to the total denier of the filaments.

Accordingly, a primary object of this invention is to provide an apparatus for preparing advantageously excellent crimped bulky filaments having such high percentage crimp as could never be attained by the conventional apparatus under the same conditions.

Other objects and advantages will become apparent from the description given hereinafter.

In order that this invention may be more fully understood, the process and apparatus will now be described with reference to the accompanying drawings.

FIG. 1-A is a diagram illustrating the principle of the operational effect attained in the process of this invention.

FIG. 1-B is a diagram illustrating the principle of the operational effect attained in the conventional process.

FIGS. 2-A, 2-B, 2-C, 2-D, 2-E and 2-F are partial diagrammatic plan views of assembly screens in accordance with the present invention.

FIG. 3-A is a diagrammatic plan view of another embodiment of an assembly screen in accordance with the present invention.

FIG. 3-B is a perspective view of a further embodiment of an assembly screen in accordance with the present invention.

FIGS. 4-A and 4-B are broken perspective views of apparatus for preparing crimped bulky filaments in accordance with the present invention.

FIG. 5A is a broken cross section of the support frame for the assembly screen of FIG. 4-A.

FIGS. 5-B and 5-B' are rear elevations of rollers of the apparatus of FIG. 4-B.

A section of an assembly screen comprising two adjacent layers of screens is shown in FIG. 1-A. A portion of the upper screen composed of metallic wires 1,1 — 1',1'and a portion of the lower screen composed of metallic wires 2,2 — 2',2' are shown in the Figure. A jet stream projected in the direction indicated by arrows in the Figure impinges against the screen and passes through it while leaving filaments in a plasticized condition in the assembly screen. In this case, the jet stream which has passed through, for instance, the perforation between two neighboring wires 1,1 of the upper screen, is obstructed by wire 2 of the lower screen at a portion of the lower screen overlapping the perforation between wires 1,1 of the upper screen (said portion corresponds to an area indicated by *a* in the Figure). As a result, the jet stream passes through the lower screen under a resistance greater than that imposed thereon at the upper screen. However, the jet stream can pass through said lower screen easily only with an increased resistance being imposed thereon. Accordingly, the passage of the jet stream through the assembly screen causes a crimping action in the screen depth. It is as if a stuffer crimper of a small size were provided. Such crimper-like space is formed with respect to each of the perforations of the upper screen. The assembly screen becomes as if it were constructed with numerous small crimpers. Thus, the filaments undergo numerous folding crimping actions, and numerous folded crimps are formed in the filaments as shown by the dotted lines in the Figure.

On the other hand, in accordance with the conventional process, the principle of which is illustrated in FIG. 1-B, such a multiple-crimper action is not caused, and only coarse crimps shown by dotted lines in the Figure are formed in the filaments.

Accordingly, in this invention it is possible to obtain crimped bulky filaments having a much higher percentage crimp than those obtained in the conventional process.

In the apparatus of the present invention for crimping the filaments under conditions which satisfy the specific temperature and pressure of the jet stream, the feed rate of the filaments, the total denier of the filaments, and $(x)=(D) \times (R)$, it is necessary that the perforation ratio of the assembly screen should be 20–60 percent, the distance between the upper and lower screens should be up to 2 mm, the distance between the open end of the jet and the upper screen should be up to 3 mm, and that the plane perforation area of each portion of said lower screen overlapping each perforation of said upper screen is smaller than the plane area of each perforation of said upper screen, said portion of said lower screen having an open space sufficient for the jet stream to pass through said portion and freely escape from the assembly screen.

The space causing the multiple-crimper action in the screen depth with respect to each perforation of the upper screen also plays a role of preventing scattering of filaments by reflection of the jet stream. Therefore, not only the operation is far more facilitated but also the uniformity of crimps can be further increased.

Thus, in accordance with this invention, the assembly screen not only exhibits the above mentioned multiple-crimper action as if it were constructed with numerous continuous small stuffer crimpers, but also prevents the scattering of filaments. Accordingly, it is possible to use an assembly screen comprising screens of such a perforation ratio that adoption thereof would be difficult or impossible in the conventional method because of violent reflection of the jet stream. The perforation ratio of the assembly screen is in the range of from about 20 to about 60 percent in this invention.

FIGS. 2-A to F are diagrammatic plan views (partial views) illustrating modifications of the assembly screen of the invention. In these modifications, the plane configuration of the perforation is quadrate or rectangular, but the plane configuration of the perforation is not restricted to quadrate and rectangular forms alone. The configuration may be changed optionally, and other various plane configurations such as polygonal configurations or configurations defined by wavy lines or curves may be adopted. Further, the material of the screen is not restricted to metal alone. Any material can be used as far as it can resist the heat and impinging pressure of the heated jet stream, and examples include heat-resistant resin, ceramic, glass and the like.

The drawings, illustrate only embodiments of the assembly screen comprising two layers of the upper screen and the lower screen, but if desired, an assembly screen comprising three or more screen layers, can be employed.

In an embodiment shown in FIG. 2-A, the upper screen (indicated by solid lines: same in the following description) and the lower screen (indicated by broken lines: same in the following description) have the same plane perforation configuration. The two screens are superposed in a manner such that each of wire crossing points of the lower screen is positioned almost at the center of the perforation of the upper screen. FIG. 2-B illustrates an embodiment where a screen having a smaller mesh perforation than that of the upper screen is used as lower screen, and FIG. 2-C illustrates an embodiment where the mesh perforation of the lower screen is smaller than that of the upper screen and the perforation configuration of the lower screen is not square but rectangular. FIG. 2-D illustrates an embodiment where the mesh perforation of the lower screen is smaller than that of the upper screen and the mesh perforation plane configuration of the upper screen is rectangular while that of the lower screen is square. Although in each of the preceding embodiments the upper and lower screen are superposed in a manner such that mesh perforations of the upper screen are in a parallel relationship to mesh perforations of the lower screen, FIG. 2-E illustrates an embodiment where the two screens are superposed in a manner such that mesh lines of the upper screen are diviated by 45° from those of the lower screen. FIG. 2-F illustrates an embodiment where the mesh lines of the upper screen are deviated from those of the lower screen in a similar manner as in FIG. 2-E.

In each of the preceding embodiments, the mesh perforation area of the lower screen is equal to, or smaller than, that of the upper screen. However, it is also possible to make the mesh perforation area of the lower screen greater than that of the upper screen. For instance, in the embodiment shown in FIG. 2-F the positions of the lower screen indicated by broken lines and the upper screen indicated by solid lines may be interchanged while the overlapping configuration is not changed.

It is preferred in any case that screen layers are superposed in a manner such that plane configurations of each perforation of the assembly screen seen through each perforation of the uppermost screen are substantially identical. The reason is that when there is a great difference among plane configurations of perforations of the assembly screen, deviation in either the multiple-crimper action in the screen depth or in the action of preventing scattering of filaments sometimes becomes not negligible, resulting in reduction of the uniformity in crimps of the resulting filaments.

In the practice of the invention, the movement of the assembly screen can be conducted in a manner known in the art. For instance, a rotary screen disk or an endless belt may be adopted. It is also possible to move the assembly screen in the form of a rotary screen drum. Where the assembly screen is moved using an endless belt or rotary screen drum system, embodiments such as illustrated in FIGS. 3-A and 3-B may be adopted as well as the embodiments explained hereinabove by referring to FIGS. 2-A to 2-F.

FIG. 3-A is a plane view similar to FIG. 2-A. In this embodiment the upper screen indicated by solid lines is a slit screen and the lower screen is similar to that shown in FIG. 2-A. If the assembly screen of this type is used, the direction of moving the assembly screen is restricted and the assembly screen is moved in a direction crossing the slit lines of the upper screen, preferably substantially vertically thereto. FIG. 3-B is a perspective view illustrating another embodiment where the assembly screen consists of one continuous member having a wavy configuration, in which parts indicated by solid lines play a role of the slit upper screen shown in FIG. 3-A, and concave parts between slit lines indicated by broken lines act as the lower screen. Also in this embodiment it is preferred to move the assembly screen in a direction crossing the slit lines substantially vertically.

The operation of moving the screen in the form of a rotary screen disk, an endless screen belt, a rotary screen drum or the like and impinging thermoplastic synthetic continuous filaments in a heated jet stream upon the screen is well known in the art. Since any detailed explanation of this operation will only make the specification too lengthy, typical instances of this operation will be simply described by referring to FIGS. 4-A and 4-B.

In FIG. 4-A, filaments $f$ are fed at a constant rate to jet 6 via, for instance, a guide 5 by means of feed rolls 3,4. The filaments are carried by a heated jet stream projected from the jet 6 and are impinged upon an assembly screen disk 7. The stream passes through the assembly screen, while the filaments, which have been impinged on the assembly screen in a plasticized condition, are left on the assembly screen and undergo the above mentioned multiple-crimper action and scatter-preventing action on the assembly screen. Thus, crimps are advantageously formed in the filaments. According to the rotation of the disk (the rotating direction is indicated by an arrow in the Figure) the filaments are cooled and at a suitable point on the screen they are taken up from the screen surface via, for instance, a guide 5' by means of delivery rolls (not shown) similar to feed rolls 3, 4. FIG. 4-B illustrates a similar embodiment of the operation performed in the same manner as above except that an assembly screen of an endless belt type is used instead of the assembly screen disk (feed rolls are not shown). An assembly screen 7 spread on rollers 8, 8' rotated by suitable means is moved by the rotation of the rollers (the rotation direction is indicated by an arrow in the Figure), and filaments are fed and impinged upon the assembly screen to be crimped in the same manner as above. Then, they are cooled and taken up from the assembly screen in the same manner as above.

In this invention, since prevention of free escape of the jet stream after its passing through the lowermost screen adversely affects the multiple-crimper action caused in the screen depth, it is especially preferred in the case of employing the assembly screen of a screen disk type such as shown in FIG. 4-A to provide a supporting member for fixing the screen disk onto the rotary shaft in order not to prevent free escape of the jet stream.

For attaining the above object, as is shown in a sectional diagram of FIG. 5-A, numerous small holes 9 are perforated through a part of a frame 10 confronting the back of the screen 7 hung on the frame and said part is supported and fixed to the head of a shaft 11, or a projecting part of the side wall of the frame 10 may be supported and fixed to the head of the shaft 11 by means of a plurality of arms.

In accordance with the conventional process, when a mechanism of the type shown in FIG. 4-B is used, it is impossible to project the jet stream directly to a rotary roller 8, because in such case the jet stream cannot pass through the screen freely and a major portion of the jet stream reflects, flows backward and scatters, rendering the operation impossible.

In the case of a mechanism of a type such as shown in FIG. 4-B, it sometimes happens that upward and downward movements are caused to occur on the surface of the belt-like screen by an impact of the impingement of the jet stream. In such case, the distance between the open end of the jet and the screen surface changes. Since the above distance is usually very small and up to 10 mm, for instance, on the order of 1.5 mm to 5 mm, even if the change is very small, the change ratio of the above distance is extremely high. Further, the above change is caused to occur not regularly but considerably randomly. Therefore, even a small change in the above distance will result in a great deviation in the multiple-crimper action and filament-scatter-preventing action of the assembly screen, and it becomes difficult to maintain the uniform quality of the resulting crimped bulky filaments.

In order to overcome the above mentioned difficulty, it is preferable to provide, as is shown in FIG. 5-B, a circular groove on a part of the roller 8 in the longitudinal direction thereof to thereby form a space 9 and to arrange a jet 6 in a manner such that the jet stream from the jet 6 will impinge against the screen at a position confronting the groove. Although the jet may be arranged in an optional position confronting the circular groove on the roller, it is preferred to arrange the jet 6 so as to confront a portion of the groove that is still in contact with the assembly screen 7 but just before the portion at which the assembly screen 7 is released from the contact with the roller 8. No special restriction is given to said circular groove with respect to configuration, depth and the like. In short, any type of the groove is applicable as far as it allows the jet stream to freely escape along the groove. If desired, a roller comprising a circular die connected therewith concentrically and having a diameter smaller than that of the roller may be used. Further, it is possible to use two dies 8a, 8a fixed to each other by means of a plurality of arms, (See FIG. 5-B' wherein the numerical reference 12 represents an arm and the screen is not shown). It is sufficient that at least three arms be utilized with the three arms disposed in a manner such that each of the bases of the arms is a vertex of an equilateral triangle. Of course, it is possible to dispose four or more arms in a polygonal pattern.

Any jet can be used as jet 6 in this invention as far as it has a structure capable of projecting filaments by a heated jet stream. But it is preferred to use a jet having a structure not forming a turbulent flow area inside the jet nozzle. For instance, a jet of a structure of the suction gun type is preferably used. In case a turbulent flow area is formed inside the jet nozzle, entanglements of monofilaments prevail in filaments (rendering it impossible to impart fine crimps to filaments) and hence, monofilaments are not sufficiently disentangled by stretching conducted after the crimp-setting treatment, which in turn adversely affects the crimp properties of the resulting filaments. On the other hand, when a jet of the above mentioned preferred type is used, monofilaments are not bound or entangled at impingement of plasticized filaments upon the screen surface, and hence, fine crimps are imparted to filaments.

As demonstrated in examples which will appear hereinafter, in accordance with this invention there can be obtained crimped bulky filaments having crimps of fine configuration and of high percentage crimp. In addition, the invention can also provide filaments capable of exhibiting a shaped pattern when dyed, by intermittently imparting such fine crimps to filaments. In order to obtain such filaments it is preferred to use an assembly screen in which each line of the uppermost screen has a large diameter or each line of the uppermost screen consists of a plurality of wires. When such assembly screen is used, filaments positioned on such lines of the uppermost screen exhibit a lower dye adsorption rate than filaments positioned on perforations of the uppermost screen and subjected to the multiple-crimper action as is illustrated in FIG. 1-A. Accordingly, there can be obtained filaments composed of portions having fine crimps and being dyed deep and portions having a silky touch and being dyed light.

The "percentage crimp" referred to in this invention is a value measured and calculated in the following manner.

A sample of crimped filaments is dipped in boiling water for 30 minutes and cooled in the air. After the removal of water, the sample is allowed to stand for 24 hours. A load of 0.1 g/d is imposed on the sample, and the sample is maintained in this state for 30 seconds. Then, the filament length ($a$) of the sample is measured. Then the load is removed, and after two minutes have passed, a load of 2 mg/d is exerted again on the sample and the sample is allowed to stand in this state for 30 seconds. Then, the filament length ($b$) of the sample is measured. The value of percentage crimp is calculated from the following formula:

$$\text{Percentage crimp} = \frac{(a-b) \times 100}{a} (\%)$$

Some embodiments of the practice of this invention will be now described by referring to examples.

Examples 1 – 9 and Comparative Examples 1 – 5

Runs are conducted by employing an apparatus of the screen disk type shown in FIG. 4-A and an assembly screen of a type shown in FIG. 2-A. Operating conditions and values of the percentage crimp of the resulting filaments are shown in Table I below.

Table I also shows the results of Comparative Examples where the operation is conducted in the same manner except employing a screen of a single layer in accordance with the conventional process.

The expression "smooth" or "stable" means that the accumulation of filaments on the screen is good, and the removal of the filaments is smooth. The term "non-smooth" or "unstable" means that the accumulation of the filaments on the screen is too deep, and the removal of the filaments is not stable nor smooth.

Examples 10 – 16 and Comparative Examples 6 – 7

Runs are conducted with the use of an apparatus of the endless belt type shown in FIG. 4-B and an assembly screen of the type shown in FIG. 2-E.

Operating conditions and values of the percentage crimp of the resulting crimped filaments are shown in Table II below.

Table II shows also the results of Comparative Examples where the operation is conducted in the same manner using a screen belt of a single layer in accordance with the conventional process.

TABLE III

| Example number | Total denier | Filament feed rate, meter/min. | (X) | Test pressure kg./cm² gauge | Jet stream temp. (°C.) | Distance between upper and lower screen surface (mm.) | Distance between nozzle and screen surface (mm.) | Perforation ratio, percent | Percentage crimp, percent | Remarks Operating | Crimp condition |
|---|---|---|---|---|---|---|---|---|---|---|---|
| Ex. 17 | 50 | 1,200 | 60,000 | 5 | 250 | 0.5 | 1 | 23 | 24 | Smooth and stable | Fine and uniform. |
| Ex. 18 | 50 | 1,200 | 60,000 | 10 | 250 | 0.5 | 1 | 25 | 22 | ...do... | Do. |
| Com. Ex. 8 | 30 | 2,000 | 60,000 | 5 | 250 | 0.5 | 1 | 25 | | (Not operable)* | (Not operable)* |
| Com. Ex. 9 | 30 | 2,000 | 60,000 | 10 | 230 | 0.5 | 1 | 25 | | | |
| Ex. 18 | 4,200 | 200 | 840,000 | 5 | 230 | 1.0 | 2.0 | 50 | 18 | Smooth and stable | Fine and uniform. |
| Ex. 19 | 4,200 | 300 | 1,260,000 | 8 | 240 | 1.0 | 2.0 | 56 | 17 | ...do... | Do. |
| Com. Ex. 10 | 5,250 | 200 | 1,050,000 | 6 | 230 | 1.5 | 2.0 | 75 | | (Not operable)** | (Not operable)** |
| Com. Ex. 11 | 5,250 | 300 | 1,575,000 | 10 | 240 | 1.5 | 2.0 | 75 | | | |
| Com. Ex. 12 | 50 | 1,200 | 60,000 | 2 | 250 | 0.5 | 1 | 35 | 9 | Unstable | Coarse and non-uniform. |
| Com. Ex. 13 | 50 | 1,200 | 60,000 | 2 | 250 | 0.5 | 1 | 23 | | (Not operable)** | |
| Com. Ex. 14 | 50 | 1,200 | 60,000 | 13 | 250 | 1.0 | 1 | 60 | 8 | Unstable | Coarse and non-uniform. |
| Com. Ex. 15 | 50 | 1,200 | 60,000 | 13 | 250 | 1.0 | 1 | 23 | | (Not operable)** | |

*Not suitable for the processing method disclosed in the present application because of the frequent occurrence of filament break.
**Filaments are scattered at random to form entanglements and intertwinements.

Examples 20 – 24 and Comparative Examples 16 – 21

Experiments have been performed employing the same type of screen disk and assembly screen as described in Examples 17 – 19. Operating conditions and values of the percentage crimp of the resulting filaments are shown in the following table IV.

| Filament | Filaments feeding rate | jet stream temp. | jet press. | used screen disk | screen speed |
|---|---|---|---|---|---|
| Nylon 6 210de/15fil. | 300m/min. | 250°C | 5kg/cm² | 26cmφ | 30m/min. |

Examples 29 – 33 and Comparative Examples 22 – 27

Experiments have been performed as described in Examples 20 – 24. Operation conditions and values of the percentage crimp of the resulting filaments are shown in the following Table V

| filament | filaments feeding rate | jet stream temp. | jet press. | used screen | screen speed disk |
|---|---|---|---|---|---|
| nylon 6 2100de/136fil. | 300m/min. | 240°C | 6kg/cm² | 26cmφ | 30m/min. |

TABLE IV

| Example number | Assembly screen (mesh) Upper | Lower | Distance between nozzle and net, mm. | Distance between upper and lower layers | Perforation ratio, percent | Percentage crimp, percent | Remarks Operation | Crimp condition |
|---|---|---|---|---|---|---|---|---|
| Ex. 20 | 20 | 30 | 1.5 | (²) | 32 | 34 | Smooth and stable | Fine and uniform. |
| Ex. 21 | 20 | 30 | 1.5 | 0.5 | 32 | 36 | ...do... | Do. |
| Ex. 22 | 20 | 30 | 1.5 | 1.0 | 32 | 34 | ...do... | Do. |
| Ex. 23 | 20 | 30 | 1.5 | 1.5 | 32 | 32 | ...do... | Do. |
| Ex. 24 | 20 | 30 | 1.5 | 2.0 | 32 | 29 | ...do... | Do. |
| Com. Ex. 16 | 20 | 30 | 1.5 | 2.5 | 32 | 25 | Non-smooth and unstable | Coarse and non-uniform. |
| Com. Ex. 17 | 20 | 30 | 1.5 | 3.0 | 32 | 24 | ...do... | Do. |
| Com. Ex. 18 | ¹20 | | 1.5 | | 62 | 24 | ...do... | Do. |
| Com. Ex. 19 | (Same as Example 22 except that the temperature of the jet stream is 180° C.) | | | | | 15 | ...do... | Do. |
| Com. Ex. 20 | (Same as Example 24 except that the jet pressure is 15 kg./cm.²) | | | | | | Not operable (scatter) | |
| Com Ex. 21 | (Same as Example 21 except that the jet pressure is 2 kg./cm.²) | | | | | 10 | Non-smooth and unstable | Coarse and non-uniform. |
| Ex. 25 | 20 | 30 | 0.5 | 0.5 | 32 | 34 | Stable | Fine and uniform. |
| Ex. 26 | 20 | 30 | 1.0 | 0.5 | 32 | 35 | ...do... | Do. |
| Ex. 27 | 20 | 30 | 1.5 | 0.5 | 32 | 34 | ...do... | Do. |
| Ex. 28 | 20 | 30 | 2.0 | 0.5 | 32 | 32 | ...do... | Do. |

¹ Single mesh.
² Contact.

TABLE V

| Example number | Assembly screen Upper | Lower | Distance between nozzle and screen surface, mm. | Distance between upper and lower layers, mm. | Perforation ratio, percent | Percentage crimp, percent | Remarks Operation | Crimp condition |
|---|---|---|---|---|---|---|---|---|
| Ex. 29 | 10 | 15 | 2.0 | 0 | 48 | 18 | Stable | Fine and uniform. |
| Ex. 30 | 10 | 15 | 2.0 | 0.5 | 48 | 20 | ...do... | Do. |
| Ex. 31 | 10 | 15 | 2.0 | 1.0 | 48 | 21 | ...do... | Do. |
| Ex. 32 | 10 | 15 | 2.0 | 1.5 | 48 | 20 | ...do... | Do. |
| Ex. 33 | 10 | 15 | 2.0 | 2.0 | 48 | 15 | ...do... | Do. |
| Com. Ex. 22 | 10 | 15 | 2.0 | 2.5 | 48 | 14 | Nonsmooth | Coarse and nonuniform. |
| Com. Ex. 23 | 10 | 15 | 2.0 | 3.0 | 48 | 14 | ...do... | Do. |
| Com. Ex. 24 | ¹10 | | 2.0 | | 75 | 14 | ...do... | Do. |
| Ex. 30 | 10 | 15 | 0.5 | 1.0 | 48 | 18 | Stable | Fine and uniform. |
| Ex. 31 | 10 | 15 | 1.0 | 1.0 | 48 | 19 | ...do... | Do. |
| Ex. 32 | 10 | 15 | 1.5 | 1.0 | 48 | 21 | ...do... | Do. |
| Ex. 33 | 10 | 15 | 2.0 | 1.0 | 48 | 20 | ...do... | Do. |
| Ex. 34 | 10 | 15 | 2.5 | 1.0 | 48 | 20 | ...do... | Do. |
| Ex. 35 | 10 | 15 | 3.0 | 1.0 | 48 | 20 | ...do... | Do. |
| Com. Ex. 25 | 10 | 15 | 3.5 | 1.0 | 48 | 15 | Unstable | Coarse and nonuniform. |
| Com. Ex. 26 | 10 | 15 | 5.0 | 1.0 | 48 | 10 | ...do... | Do. |
| Com. Ex. 27 | (Same as Example 35 except using 5,250 de./340 fil. Nylon 6 filaments) | | | | | 8 | ...do... | Do. |

¹ Single mesh.

TABLE I

| Example Number | Continuous filament to be treated | Rate of feeding filaments to jet, m/min. | Temperature of heated jet stream (air) °C. | Air pressure inside jet, kg./cm.² | Distance between open end for projecting jet stream and screen surface, mm. | Diameter of assembly screen disk, cm. | Rotation rate (peripheral) of disk, m./min. |
|---|---|---|---|---|---|---|---|
| Example 1 | 210 de./15 fil. poly-ε-caprolactam | 300 | 250 | 5 | 2 | 26 | 30 |
| Comparative Example 1 | do | 300 | 250 | 5 | 2 | ¹ 26 | 30 |
| Example 2 | do | 300 | 250 | 5 | 2 | 26 | 30 |
| Comparative Example 2 | do | 300 | 250 | 5 | 2 | ¹ 26 | 30 |
| Comparative Example 3 | do | 300 | 250 | 5 | 2 | ¹ 26 | 30 |
| Example 3 | do | 300 | 250 | 5 | 2 | 26 | 70 |
| Example 4 | 75 de./36 fil. polyethylene terephthalate | 1,000 | 260 | 5 | 1.0 | 26 | 95 |
| Comparative Example 4 | do | 1,000 | 260 | 5 | 1.0 | ¹ 26 | 95 |
| Example 5** | 210 de./15 fil. poly-ε-caprolactam | 300 | 250 | 5 | 2 | 26 | 30 |
| Example 6** | 75 de./36 fil. polyethylene terephthalate | 800 | 260 | 5 | 1.2 | 26 | 75 |
| Example 7 | 2100 de./136 fil. poly-ε-caprolactam | 300 | 240 | 6 | 3 | 26 | 40 |
| Comparative Example 5 | do | 300 | 240 | 6 | 3 | ¹ 26 | 40 |
| Example 8 | 210 de./15 fil. poly-ε-caprolactam | 800 | 250 | 5 | 1.5 | 26 | 75 |
| Example 9 | 75 de./36 fil. polyethylene terephthalate | 1,000 | 270 | 5 | 1.5 | 26 | 95 |

| | Assembly screen | | | | | Remarks | |
|---|---|---|---|---|---|---|---|
| Example Number | Upper screen [mesh] | Lower screen [mesh] | Perforation ratio, percent | Distance between upper and lower screens, mm. | Percentage crimp, percent | Operation | Crimp condition |
| Example 1 | 20 (No. 35 wire) | 30 (No. 36 wire) | 32 | 0.5 | 34 | Smooth and stable | Fine and uniform. |
| Comparative Example 1 | do | | 62 | | 23 | do | Coarse and non-uniform. |
| Example 2 | do | 40 (No. 40 wire) | 30 | 0.5 | 36 | do | Fine and uniform. |
| Comparative Example 2 | 30 (No. 36 wire) | | 52 | | 24 | Unstable | Coarse and non-uniform. |
| Comparative Example 3 | 40 (No. 40 wire) | | 48 | | 20 | do | Do. |
| Example 3 | 20 (No. 35 wire) | 40 (No. 40 wire) | 30 | 0.5 | 33 | Smooth and stable | Fine and uniform. |
| Example 4 | 40 (No. 40 wire) | do | 23 | 0.3 | 24 | do | Do. |
| Comparative Example 4 | do | | 48 | | 18 | Unstable | Coarse and non-uniform. |
| Example 5** | 20 (No. 35 wire) | 30 (No. 36 wire) | 32 | 0.5 | 36 | Smooth and stable | Fine and uniform. |
| Example 6** | 40 (No. 40 wire) | 40 (No. 40 wire) | 23 | 0.3 | 27 | do | Do. |
| Example 7 | 10 (No. 30 wire) | 15 (No. 30 wire) | 48 | 1.0 | 21 | do | Do. |
| Comparative Example 5 | do | | 75 | | 15 | Unstable | Coarse and non-uniform. |
| Example 8 | 30 (No. 38 wire) | 40 (No. 40 wire) | 25 | 0.5 | 28 | Smooth and stable | Fine and uniform. |
| Example 9 | 40 (No. 40 wire) | 50 (No. 40 wire) | 20 | 0.3 | 26 | do | Do. |

¹ Single screen.
*The count number of wire is pursuant to Japanese Industrial Standards G-3555 (plain weave metal mesh) and G-3532 (iron wire).
**A screen disk of a type shown in Figure 5-A where the frame is supported by 4 arms is used in Examples 5 and 6.

TABLE II

| Example number | Continuous filament to be treated | Rate of feeding filaments to jet m./min. | Temperature of heated jet stream (air) °C. | Air pressure inside jet, kg./cm.² | Distance between open end for projecting jet stream and screen surface, mm. | Distance between belt driving rolls, cm. | Moving speed of belt, (peripheral) m./min. |
|---|---|---|---|---|---|---|---|
| Example 10 | 210 de./15 fil. poly-ε-caprolactam | 500 | 250 | 6 | 1.5 | 200 | 45 |
| Comparative Example 6 | do | 500 | 250 | 6 | 1.5 | ¹ 200 | 45 |
| Example 11 | 210 de./34 fil. poly-ε-caprolactam | 800 | 250 | 5 | 1.5 | 200 | 75 |
| Comparative Example 7 | do | 800 | 250 | 5 | 1.5 | ¹ 200 | 75 |
| Example 12 | 2100 de./136 fil. poly-ε-caprolactam | 300 | 230 | 6 | 3 | 200 | 40 |
| Example 13 | 75 de./36 fil. polyethylene terephthalate | 1,000 | 270 | 5 | 1.5 | 200 | 95 |
| Example 14* | 210 de./34 fil. poly-ε-caprolactam | 800 | 250 | 5 | 1.5 | 200 | 75 |
| Example 15** | do | 800 | 250 | 5 | 1.5 | 200 | 75 |
| Example 16 | 3,150 de./224 fil. poly-ε-caprolactam | 1,500 | 240 | 10 | 2.0 | 200 | 170 |

| | Assembly screen | | | | | Remarks | |
|---|---|---|---|---|---|---|---|
| Example number | Upper screen (mesh) | Lower screen (mesh) | Perforation ratio, percent | Distance between upper and lower screen, mm. | Percentage crimp, percent | Operation | Crimp condition |
| Example 10 | 30 (No. 35 wire) | 40 (No. 40 wire) | 25 | 0.3 | 34 | Smooth and stable | Fine and uniform. |
| Comparative Example 6 | do | | 52 | | 25 | Unstable | Coarse and non-uniform. |
| Example 11 | 40 (No. 40 wire) | 40 (No. 40 wire) | 23 | 0.3 | 30 | Smooth and stable | Fine and uniform. |
| Comparative Example 7 | do | | 48 | | 19 | Unstable | Coarse and non-uniform. |
| Example 12 | 10 (No. 30 wire) | 15 (No. 30 wire) | 48 | 1.0 | 18 | Smooth and stable | Fine and uniform. |
| Example 13 | 40 (No. 48 wire) | 50 (No. 40 wire) | 20 | 0.3 | 28 | do | Do. |
| Example 14* | do | 40 (No. 40 wire) | 23 | 0.3 | 33 | do | Do. |
| Example 15* | do | 40 (No. 40 wire) | 23 | 0.3 | 32 | do | Do. |
| Example 16 | 10 (No. 30 wire) | 15 (No. 30 wire) | 48 | 1.0 | 18 | do | Do. |

¹ Single screen.
*A roller of a type shown in Figure 5-B is used.
**A roller of a type shown in Figure 5-B' is used.

Examples 17 – 19 and Comparative Examples 8 – 15

Experiments have been performed by employing an apparatus of the screen disk type shown in FIG. 4-A and an assembly screen of the type shown in FIG. 2-F. Operating conditions and values of the percentage crimp of the resulting filaments are shown in the following Table III.

Note: The percentage crimp required for practical purposes is at least 28 percent for nylon 6 (210 denier/15 filaments), at least 15 percent for nylon 6 (2,100 denier/136 filaments), and at least 12 percent for nylon 6 (5,250 denier/340 filaments).

Examples 34 – 42 and Comparative Examples 28 – 30

Experiments have been performed as described in Examples 20 – 24. Operating conditions and values of the percentage crimp of the resulting filaments are shown in following Table VI.

| Filaments feeding rate | Jet stream temp. | Used screen disk | Screen speed |
|---|---|---|---|
| 300m/min. | 240°C. | 26 cmφ | 30m/min. |

TABLE VI

| Example number | Filaments | Assembly screen (mesh) | | Distance between nozzle screen surface and mm. | Distance between upper and layers, mm. | Jet stream press., kg./cm.² | Perforation ratio, percent | Percentage crimp, percent | Remarks | |
|---|---|---|---|---|---|---|---|---|---|---|
| | | Upper | Lower | | | | | | Operation | Crimp condition |
| Com. Ex. 28 | Nylon 6 2,100/536 fil | ¹ 30 | | 2.0 | | 5 | 52 | 14 | Unstable | Coarse and non-uniform. |
| Com. Ex. 29 | do | 4 | 10 | 2.0 | 1.0 | 8 | 70 | 12 | do | Do. |
| Ex. 34 | do | 10 | 10 | 2.0 | 1.0 | 5 | 56 | 18 | Stable | Fine and uniform. |
| Ex. 35 | do | 10 | 15 | 2.0 | 1.0 | 5 | 48 | 21 | do | Do. |
| Ex. 36 | do | 10 | 20 | 2.0 | 1.0 | 5 | 46 | 20 | do | Do. |
| Ex. 37 | do | 10 | 30 | 2.0 | 1.0 | 5 | 38 | 18 | do | Do. |
| Ex. 38 | do | 20 | 30 | 2.0 | 1.0 | 5 | 32 | 16 | do | Do. |
| Com. Ex. 30 | do | 20 | 60 | 2.0 | 1.0 | 5 | 18 | | Not operable (scattered) | |
| Ex. 39 | Nylon 6 210 de. 15 fil | 20 | 30 | 1.5 | 0.5 | 5 | 32 | 34 | Stable | Fine and uniform. |
| Ex. 40 | do | 20 | 40 | 1.5 | 0.5 | 5 | 30 | 35 | do | Do. |
| Ex. 41 | do | 20 | 50 | 1.5 | 0.5 | 5 | 25 | 34 | do | Do. |
| Ex. 42 | Polyester* 75 de./36 fil | 40 | 40 | 1.5 | 0.3 | 5 | 23 | 27 | do | Do. |

¹ Single screen.
*Filaments feeding rate 1,000 m./min.; jet stream temp. 270° C.; screen speed 95 m./min.

NOTE.—The percentage crimp required for practical purposes is at least 20% for polyester (75 denier/36 filaments).

What we claim is:

1. In an apparatus for preparing crimped bulky filaments including a feed roll for feeding continuous non-crimped thermoplastic synthetic filaments having a total denier of 40 – 5,000 at a rate of at least 250 m/min. to a jet nozzle having an open end for projecting a heated jet stream accompanying the filaments fed to said jet nozzle, the jet stream being held at a temperature of from 200° C. to a point 40° C. higher than the melting point of the filaments and a pressure of from 3 to 12 kg/cm² gauge, a moving screen upon which the heated jet stream impinges allowing the heated jet stream to pass therethrough while leaving the filaments on the screen, and a take-up roll for removing the crimped filaments, wherein the value $(x)$ expressed by the following formula is at least 60,000 de.meter/min.

$$(x) = (D) \times (R)$$

in which $D$ is the total denier of the filaments fed to the jet nozzle and $R$ is the filament feeding rate, the improvement comprising said moving screen being an assembly screen having a perforation ratio of from 20 to 60 percent and including at least a perforated upper screen and a perforated lower screen, said upper and lower screens being spaced by a distance up to 2mm., the plane perforation area of each portion of said lower screen overlapping each perforation of said upper screen being smaller than the plane area of each perforation of said upper screen, said overlapping portions of said lower screen providing an open space sufficient for the jet stream to pass through said portions and freely escape from said assembly screen, and said open end of said jet nozzle being spaced from said upper screen by a distance of up to 3 mm.

2. The apparatus described in claim 1, wherein said assembly screen has a disk configuration and further comprising a supporting member carrying said assembly screen disk and having means for permitting the jet stream to freely escape therefrom after passing through said assembly screen disk, and a rotary shaft mounting said supporting member to rotate said assembly screen disk.

3. The apparatus described in claim 1 wherein said assembly screen has an endless belt configuration and further comprising a rotary roll driving said endless belt assembly screen, said rotary roll having a peripheral groove, said opening of said jet nozzle for projecting said heated jet stream being disposed at a position confronting said groove to allow the jet stream to pass through said endless belt assembly screen and escape.

4. The apparatus described in claim 1 wherein said assembly screen has an endless belt configuration and further comprising a pair of rotary disks driving said endless belt assembly screen and positioned with spaced arms therebetween, and said opening of said jet nozzle for projecting the heated jet stream being disposed at a position confronting said spaced arms to allow the jet stream to pass through said endless belt assembly screen and escape.

* * * * *